US012583064B2

(12) United States Patent
Schneider et al.

(10) Patent No.: US 12,583,064 B2
(45) Date of Patent: Mar. 24, 2026

(54) MACHINING OF CERAMIC MATRIX COMPOSITE DURING PREFORMING AND PARTIAL DENSIFICATION

(71) Applicant: RTX Corporation, Farmington, CT (US)

(72) Inventors: Kendall J. Schneider, Middletown, CT (US); Alan C. Barron, Jupiter, FL (US); Mary Colby, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 175 days.

(21) Appl. No.: 18/305,163

(22) Filed: Apr. 21, 2023

(65) Prior Publication Data

US 2023/0278150 A1     Sep. 7, 2023

Related U.S. Application Data

(62) Division of application No. 17/541,826, filed on Dec. 3, 2021, now Pat. No. 11,633,816.

(51) Int. Cl.
*B23P 15/02* (2006.01)
*B24B 7/10* (2006.01)

(52) U.S. Cl.
CPC ................ *B23P 15/02* (2013.01); *B24B 7/10* (2013.01)

(58) Field of Classification Search
CPC ............ B24B 27/0007; B24B 27/0015; B24B 27/003; B24B 27/0038; B24B 27/0076; B24B 49/12; B24B 47/22
See application file for complete search history.

(56) References Cited

U.S. PATENT DOCUMENTS

| | | | | |
|---|---|---|---|---|
| 5,077,941 | A | * | 1/1992 | Whitney ................ B24B 49/16 |
| | | | | 451/6 |
| 5,723,078 | A | | 3/1998 | Nagaraj et al. |
| 5,817,371 | A | | 10/1998 | Gupta et al. |
| 9,089,949 | B2 | | 7/2015 | Hunt |
| 9,470,263 | B2 | | 10/2016 | Savela et al. |
| 10,252,395 | B2 | | 4/2019 | Palmieri et al. |
| 10,955,815 | B2 | | 3/2021 | Auxier et al. |

(Continued)

OTHER PUBLICATIONS

Search Report issued in European Patent Application No. 22210370.7; Application Filing Date Nov. 29, 2022; Date of Mailing May 4, 2023 (6 pages).

*Primary Examiner* — Joel D Crandall

(74) *Attorney, Agent, or Firm* — CANTOR COLBURN LLP

(57) ABSTRACT

A method of forming an aerodynamic component for use in a gas turbine engine using ceramic matrix composites (CMCs) is provided. The method includes executing a full densification of the CMCs once a final shape of the aerodynamic component is achieved, identifying first and second sectors of an exterior surfaces of the aerodynamic component which have a surface roughness of less than a first roughness level and identifying second sectors of the exterior surface of the component which have a surface roughness of greater than a second roughness level, machining the first sectors to increase the surface roughness to greater than the first roughness level and machining the second sectors to decrease the surface roughness to less than the second roughness level.

12 Claims, 3 Drawing Sheets

(56)          References Cited

U.S. PATENT DOCUMENTS

| 11,401,827 | B2 | 8/2022 | Mccaffrey |
| 2002/0072297 | A1* | 6/2002 | Kennerknecht ..... B24B 27/0038 |
| | | | 451/5 |
| 2004/0166355 | A1 | 8/2004 | Lee et al. |
| 2010/0104773 | A1 | 4/2010 | Neal et al. |
| 2011/0288673 | A1 | 11/2011 | Mundt et al. |
| 2012/0304465 | A1 | 12/2012 | Subbiah et al. |
| 2014/0075754 | A1 | 3/2014 | Barron et al. |
| 2014/0248157 | A1 | 9/2014 | Ahmad |
| 2015/0345388 | A1 | 12/2015 | Dimascio et al. |
| 2017/0122114 | A1 | 5/2017 | Kittleson et al. |
| 2018/0154495 | A1* | 6/2018 | Mullany ............. B24D 13/145 |
| 2018/0229284 | A1 | 8/2018 | Tuffs et al. |
| 2019/0022803 | A1 | 1/2019 | Srinivasan et al. |
| 2020/0070249 | A1* | 3/2020 | Ozdoganlar .............. C25F 3/16 |
| 2020/0147758 | A1* | 5/2020 | Hofstee ................ A46B 13/005 |
| 2020/0224675 | A1 | 7/2020 | Capozzi et al. |
| 2020/0269439 | A1* | 8/2020 | Telleria ................. B25J 11/005 |
| 2021/0108529 | A1 | 4/2021 | Marugi et al. |
| 2022/0002857 | A1 | 1/2022 | Li et al. |

* cited by examiner

MACHINING OF CERAMIC MATRIX COMPOSITE DURING PREFORMING AND PARTIAL DENSIFICATION

CROSS-REFERENCE TO RELATED APPLICATIONS

This application is a division of U.S. application Ser. No. 17/541,826 filed Dec. 3, 2021, the disclosure of which is incorporated herein by reference in its entirety.

BACKGROUND

Recently, ceramic matrix composites (CMCs) have been proposed as materials for components of gas turbine engines, such as blades and vanes. CMCs are a subgroup of composite materials and a subgroup of ceramics. They include ceramic fibers embedded in a ceramic matrix. The ceramic fibers and the matrix both can include any ceramic material. As compared to metallic materials that have been traditionally used in gas turbine engines, CMCs can offer improved strength and heat resistance as well as reduced weight.

When CMCs are used as materials for gas turbine engine components, such as blades and vanes, CMCs are generally laid down in various patterns over mandrels or other support structures in order to form the blade or vane shapes. The CMCs are then repeatedly compressed and heated until the desired blade or vane shape is achieved.

While CMCs offer certain advantages over metallic materials for gas turbine engine components, such as blade and vanes, the formation process remains difficult to perform and can result in surfaces that cannot be coated as needed for use in high-temperature and high-pressure environments. Previously, this issue has been handled manually, using machining tools that are inherently messy and require significant cleanup, and often resulted in sub-optimal results.

BRIEF DESCRIPTION

According to an aspect of the disclosure, a method of forming an aerodynamic component for use in a gas turbine engine using ceramic matrix composites (CMCs) is provided. The method includes executing a full densification of the CMCs once a final shape of the aerodynamic component is achieved, identifying first and second sectors of an exterior surfaces of the aerodynamic component which have a surface roughness of less than a first roughness level and identifying second sectors of the exterior surface of the component which have a surface roughness of greater than a second roughness level, machining the first sectors to increase the surface roughness to greater than the first roughness level and machining the second sectors to decrease the surface roughness to less than the second roughness level.

In accordance with additional or alternative embodiments, the second roughness level exceeds the first roughness level.

In accordance with additional or alternative embodiments, the first roughness level is about 150 RA and the second roughness level is about 250 RA.

In accordance with additional or alternative embodiments, the method further includes coating the exterior surfaces following the machining.

In accordance with additional or alternative embodiments, the machining of the first and second sectors includes autonomous adaptive machining.

In accordance with additional or alternative embodiments, the autonomous adaptive machining includes robotically applying a machining tool to the first and second sectors.

In accordance with additional or alternative embodiments, the machining tool includes an abrasive brush.

In accordance with additional or alternative embodiments, the method further comprises sensing a force applied by the machining tool against the first and second sectors and dynamically adjusting the force of the machining tool against the first and second sectors.

In accordance with additional or alternative embodiments, the autonomous adaptive machining includes engaging a CNC cutting tool.

According to an aspect of the disclosure, a method of forming a component of a gas turbine engine using ceramic matrix composites (CMCs) is provided. The method includes executing a full densification of the CMCs once a final shape of the component is achieved, identifying first sectors of exterior surfaces of the component which have a surface roughness of less than a first roughness level and identifying second sectors of the exterior surfaces of the component which have a surface roughness of greater than a second roughness level, machining the first sectors of the exterior surfaces to increase the surface roughness to greater than the first roughness level and machining the second sectors of the exterior surfaces to decrease the surface roughness to less than the second roughness level.

In accordance with additional or alternative embodiments, the second roughness level exceeds the first roughness level.

In accordance with additional or alternative embodiments, the first roughness level is about 150 RA and the second roughness level is about 250 RA.

In accordance with additional or alternative embodiments, the method further includes coating the exterior surfaces following the machining.

In accordance with additional or alternative embodiments, the machining of the first and second sectors includes autonomous adaptive machining.

In accordance with additional or alternative embodiments, the autonomous adaptive machining includes robotically applying a machining tool to the first and second sectors.

In accordance with additional or alternative embodiments, the machining tool is abrasive.

In accordance with additional or alternative embodiments, the method further includes sensing a force applied by the machining tool against the first and second sectors and dynamically adjusting the force of the machining tool against the first and second sectors.

In accordance with additional or alternative embodiments, the autonomous adaptive machining includes engaging a CNC cutting tool.

According to another aspect of the disclosure, a tooling assembly for forming a component of a gas turbine engine using ceramic matrix composites (CMCs) is provided. The tooling assembly includes a first apparatus configured to execute a full densification of the CMCs once a final shape of the component is achieved, a sensor configured to identify first sectors of exterior surfaces of the component which have a surface roughness of less than a first roughness level and to identify second sectors of the exterior surfaces of the component which have a surface roughness of greater than a second roughness level and a machining tool apparatus configured to machine the first sectors of the exterior surfaces to increase the surface roughness to greater than the first roughness level and to machine the second sectors of the exterior surfaces to decrease the surface roughness to less than the second roughness level.

In accordance with additional or alternative embodiments, the second roughness level exceeds the first roughness level.

In accordance with additional or alternative embodiments, the first roughness level is about 150 RA and the second roughness level is about 250 RA.

In accordance with additional or alternative embodiments, the machining tool apparatus comprises a machining tool, a robotic arm to which the machining tool is attached, the robotic arm being configured to pressure the machining tool against the first and second sectors of the exterior surfaces, a force sensor configured to measure a force applied by the machining tool to the first and second sectors of the exterior surfaces and a controller configured to execute autonomous adaptive machining of the first and second sectors of the exterior surfaces by controlling the machining tool and by controlling the robotic arm in accordance with readings of the force sensor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
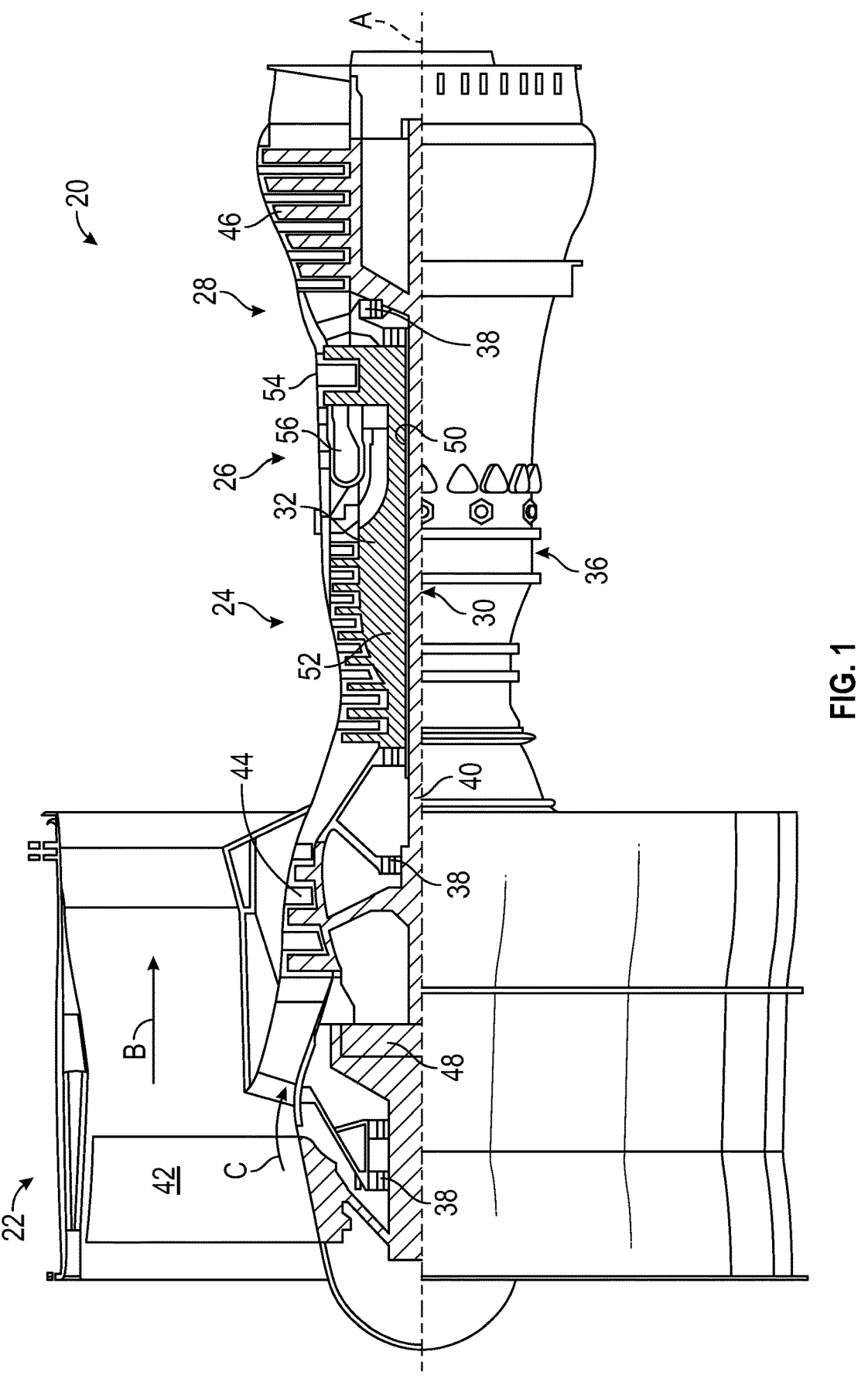
FIG. 1 a partial cross-sectional illustration of a gas turbine engine according to a non-limiting embodiment.

With reference now to FIG. 1, a gas turbine engine 20 is illustrated according to a non-limiting embodiment. The gas turbine engine 20 is disclosed herein as a multi-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with multi-spool turbofans as the teachings may be applied to other types of turbine engines including, for example, three-spool architectures.

The exemplary engine 20 generally includes one or more low-spool generator machines 30, referred to herein as a "low-spool" 30 and a high-spool generator machine 32, referred to herein as a "high-spool 32" mounted for rotation about an engine central longitudinal axis (A) relative to an engine static structure 36 via several bearing systems 38. It should be understood that various bearing systems 38 at various locations may alternatively or additionally be provided, and the location of bearing systems 38 may be varied as appropriate to the application.

The low-spool 30 generally includes an inner shaft 40 that interconnects a fan 42, a low-pressure compressor 44 and a low-pressure turbine 46. The inner shaft 40 is connected to the fan 42 through a speed change mechanism, which in exemplary gas turbine engine 20 is illustrated as a geared architecture 48 to drive the fan 42 at a lower speed than the low-spool 30. The high-spool 32 includes an outer shaft 50 that interconnects a high-pressure compressor 52 and high-pressure turbine 54. A combustor 56 is arranged in exemplary gas turbine 20 between the high-pressure compressor 52 and the high-pressure turbine 54. An engine static structure 36 is arranged generally between the high-pressure turbine 54 and the low-pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The turbines 46, 54 rotationally drive a respective low-spool 30 and high-spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low-pressure turbine 46 has a pressure ratio that is greater than about five. In one disclosed embodiment, the engine 20 bypass ratio is greater than about ten (10:1), the fan diameter is significantly larger than that of the low-pressure compressor 44, and the low-pressure turbine 46 has a pressure ratio that is greater than about five 5:1. Low-pressure turbine 46 pressure ratio is pressure measured prior to inlet of low-pressure turbine 46 as related to the pressure at the outlet of the low-pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

As will be described below, a process is provided for forming gas turbine engine components such as, for example only, airfoils and blade outer air seals (BOAS) for the gas turbine engine (20) of FIG. 1 for example. The process addresses the problem of correcting for CMC surfaces that cannot be coated as needed.

Figures 2, 3:
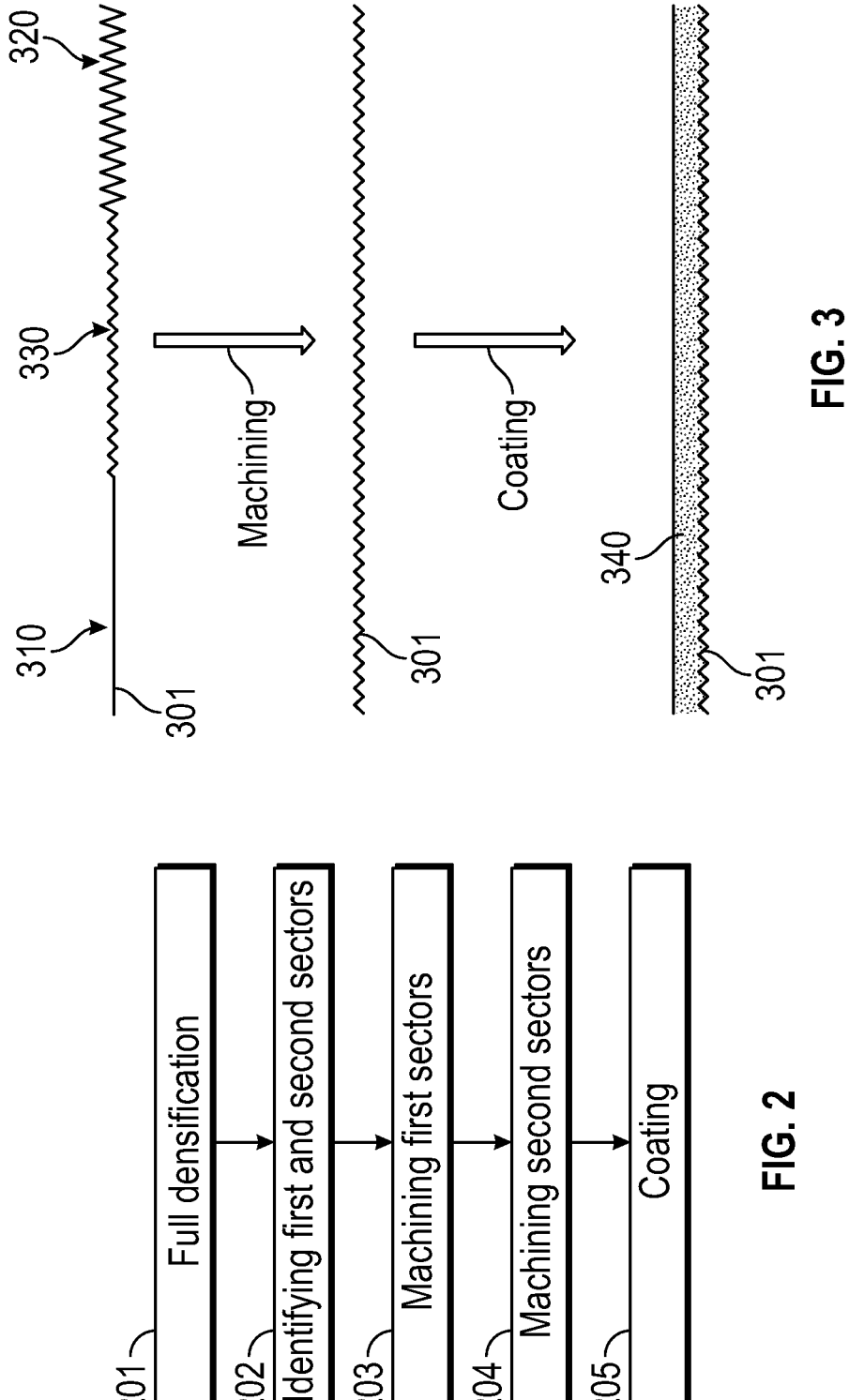
FIG. 2 is a flow diagram illustrating a method of forming an aerodynamic component using CMCs in accordance with embodiments.
FIG. 3 is a graphical depiction of the method of FIG. 2 in accordance with further embodiments.

With reference to FIG. 2, a method of forming a component such as a airfoil or a blade outer air seal (BOAS) of a gas turbine engine using CMCs is provided. As shown in FIG. 2, for the non-limiting case of the method being executed to form the component, the method includes executing a full densification of the CMCs once a final shape of the component is achieved (201), identifying first sectors of exterior surfaces of the component, which have a surface roughness of less than a first roughness level, and identifying second sectors of the exterior surfaces of the component, which have a surface roughness of greater than a second roughness level (202). The method also includes machining the first sectors of the exterior surfaces to increase the surface roughness to greater than the first roughness level (203) and machining the second sectors of the exterior surfaces to decrease the surface roughness to less than the second roughness level (204). The method can further include coating the exterior surfaces following the machining (205).

In accordance with embodiments, the first and second roughness levels can be defined for compatibility with coatings to be applied to the exterior surfaces of the component. That is, because the exterior surfaces of the component can be too smooth or too rough for compatibility with the coating, the first roughness level can be defined as being a level at which a given first sector is too smooth for a corresponding coating to be applied thereto and the second roughness level can be defined as being a level at which a given second sector is too rough for a corresponding coating to the applied thereto. Moreover, because different sections of the exterior surfaces of the component can have different coatings applied thereto (i.e., because those different sections may be exposed to different operating conditions) and because those different coatings can have different application requirements, the first and second roughness levels can be defined differently at various sections of the exterior surfaces.

As an example, a relatively adhesive coating may be applicable to an exterior surface that is very smooth whereas a non-adhesive coating might require a higher degree of surface roughness. In these or other cases, the first roughness level for the adhesive coating might be lower than the first roughness level of the non-adhesive coating. As another example, a relatively thick coating may be applicable to an exterior surface that is rougher than a relatively thin coating and, in these or other cases, the second roughness level for the thicker coating might be higher than the second roughness level of the thinner coating.

In accordance with embodiments, as a general matter, the first roughness level can be about 150 RA and the second roughness level can be about 250 RA. It is to be understood, however, that this is not required as explained above and that other first and second roughness levels are possible.

In accordance with embodiments, the machining of the first and second sectors of operations (203 and 204) can include autonomous adaptive machining that involves robotically applying a machining tool, such as an abrasive brush, to the first and second sectors. The machining of operations (203 and 204) can further include sensing a force applied by the machining tool against the first and second sectors and dynamically adjusting the force of the machining tool against the first and second sectors.

The method of FIG. 2 is illustrated schematically in FIG. 3. As shown in FIG. 3, a surface 301 is an exterior surface of a blade or a vane of a gas turbine engine (i.e., a pressure surface, a suction surface, a platform surface, etc.). The surface 301 is formed of CMCs and can be formed as a result of partial and full densifications as well as consolidating operations interleaved or interwoven between the partial and full densifications. The surface 301 can have multiple sectors including first sectors 310 that have a surface roughness of less than a first roughness level and are actually too smooth to have a given coating 340 successfully bonded thereto, second sectors 320 that have a surface roughness of more than a second roughness level and are too rough to have the given coating 340 bonded thereto and normal surfaces 330. The normal surfaces 330 have a surface roughness between the first and second roughness levels and are in condition to be coated with the given coating 340.

For the first sectors 310, the machining operation (203) can involve an intentional roughening so that the first sectors 310 are brought into a condition that is appropriate for coating. Conversely, for the second sectors 320, the machining operation 204 can involve an intentional smoothing so that the second sectors 320 are similarly brought into a condition that is appropriate for coating.

Figure 4:
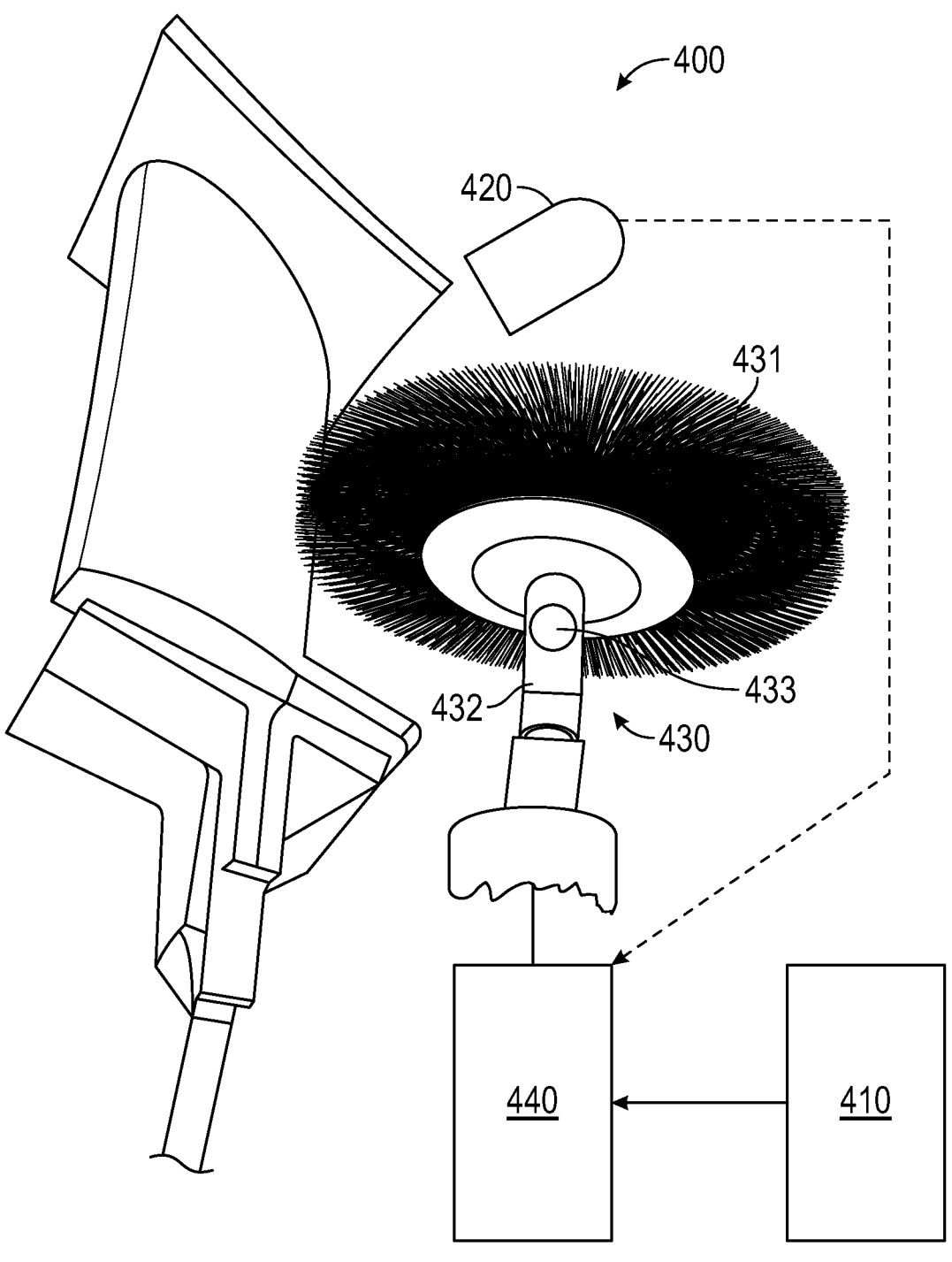
FIG. 4 is a schematic illustration of a tooling assembly in accordance with embodiments.

With reference to FIG. 4, a tooling assembly 400 is provided for forming a component of a gas turbine engine using CMCs. As shown in FIG. 4, the tooling assembly 400 includes a first apparatus 410 configured to execute a full densification of the CMCs once a final shape of the blade or the vane is achieved, a sensor 420 and a machining tool apparatus 430. The sensor 420 is configured to identify first sectors of exterior surfaces of the component which have a surface roughness of less than a first roughness level and to identify second sectors of the exterior surfaces of the component which have a surface roughness of greater than a second roughness level. The machining tool apparatus 430 is configured to machine the first sectors of the exterior surfaces to increase the surface roughness to greater than the first roughness level and to machine the second sectors of the exterior surfaces to decrease the surface roughness to less than the second roughness level.

The machining tool apparatus 430 includes a machining tool 431, such as an abrasive tool, an abrasive brush and/or a CNC cutting tool, a robotic arm 432 to which the machining tool 431 is attached, a force sensor 433 and a controller 440. The robotic arm 432 is configured to pressure the machining tool 431 against the first and second sectors of the exterior surfaces. The force sensor 433 is configured to measure a force applied by the machining tool 431 to the first and second sectors of the exterior surfaces. The controller 440 is configured to execute autonomous adaptive machining of the first and second sectors of the exterior surfaces by controlling the machining tool 431 and by controlling the robotic arm 432 in accordance with readings of the force sensor 433.

Technical effects and benefits of the present disclosure provide for the formation of a component of a gas turbine engine using CMCs and also provide for the preparation of exterior surfaces that are in a condition to be coated. In so doing, yield is improved and waste is reduced.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A tooling assembly for forming a component of a gas turbine engine using ceramic matrix composites (CMCs), the CMCs being fully densified once a final shape of the component is achieved, the tooling assembly comprising:
   a sensor configured to identify first sectors of exterior surfaces of the component which have a surface roughness of less than a first roughness level and to identify second sectors of the exterior surfaces of the component which have a surface roughness of greater than a second roughness level; and
   a machining tool apparatus configured to machine the first sectors to increase the surface roughness to greater than the first roughness level to intentionally roughen the first sectors and to machine the second sectors to decrease the surface roughness to less than the second roughness level to intentionally smooth the second sectors.

2. The tooling assembly according to claim 1, wherein the second roughness level exceeds the first roughness level.

3. The tooling assembly according to claim 1, wherein the first roughness level is 150 RA and the second roughness level is 250 RA.

4. The tooling assembly according to claim 1, wherein the machining tool apparatus comprises:
   a machining tool;
   an arm to which the machining tool is attached, the robotic-arm being configured to pressure the machining tool against the first and second sectors of the exterior surfaces;
   a force sensor configured to measure a force applied by the machining tool to the first and second sectors of the exterior surfaces; and
   a controller configured to control the machining tool and by the arm in accordance with readings of the force sensor.

5. A tooling assembly for forming a component of a gas turbine engine using ceramic matrix composites (CMCs), the CMCs being fully densified once a final shape of the component is achieved, the tooling assembly comprising:
   a sensor configured to identify first sectors of surfaces of the component which have a surface roughness of less than a first roughness level and to identify second sectors of the surfaces of the component which have a surface roughness of greater than a second roughness level, the second roughness level exceeding the first roughness level; and
   a machining tool apparatus configured to machine the first sectors to increase the surface roughness to greater than the first roughness level to intentionally roughen the first sectors and to machine the second sectors to decrease the surface roughness to less than the second roughness level to intentionally smooth the second sectors.

6. The tooling assembly according to claim 5, wherein the surfaces of the component comprise exterior surfaces.

7. The tooling assembly according to claim 5, wherein the first roughness level is 150 RA and the second roughness level is 250 RA.

8. The tooling assembly according to claim 5, wherein the machining tool apparatus comprises:
   a machining tool;
   an arm to which the machining tool is attached, the arm being configured to pressure the machining tool against the first and second sectors of the surfaces;
   a force sensor configured to measure a force applied by the machining tool to the first and second sectors of the surfaces; and
   a controller configured to control the machining tool and the arm in accordance with readings of the force sensor.

9. A tooling assembly for forming a component using ceramic matrix composites (CMCs), the CMCs being fully densified once a final shape of the component is achieved, the tooling assembly comprising:
   a sensor configured to identify first sectors of surfaces of the component which have a surface roughness of less than a first roughness level and to identify second sectors of the exterior of the component which have a surface roughness of greater than a second roughness level, the second roughness level exceeding the first roughness level; and
   a machining tool apparatus configured to machine the first sectors to increase the surface roughness to greater than the first roughness level to intentionally roughen the first sectors and to machine the second sectors to decrease the surface roughness to less than the second roughness level to intentionally smooth the second sectors.

10. The tooling assembly according to claim 9, wherein the surfaces of the component comprise exterior surfaces.

11. The tooling assembly according to claim 9, wherein the first roughness level is 150 RA and the second roughness level is 250 RA.

12. The tooling assembly according to claim 9, wherein the machining tool apparatus comprises:
   a machining tool;
   an arm to which the machining tool is attached, the arm being configured to pressure the machining tool against the first and second sectors of the surfaces;
   a force sensor configured to measure a force applied by the machining tool to the first and second sectors of the surfaces; and
   a controller configured to control the machining tool and the arm in accordance with readings of the force sensor.

* * * * *